United States Patent
Wang et al.

(10) Patent No.: US 7,852,786 B2
(45) Date of Patent: Dec. 14, 2010

(54) PEER-TO-PEER NETWORKS

(75) Inventors: Fang Wang, Ipswich (GB); Robert A. Ghanea-Hercock, Ipswich (GB); Yaoru Sun, Ipswich (GB)

(73) Assignee: British Telecommunications plc, London (GB)

( * ) Notice: Subject to any disclaimer, the term of this patent is extended or adjusted under 35 U.S.C. 154(b) by 607 days.

(21) Appl. No.: 11/596,702

(22) PCT Filed: May 18, 2005

(86) PCT No.: PCT/GB2005/001944

§ 371 (c)(1),
(2), (4) Date: Nov. 16, 2006

(87) PCT Pub. No.: WO2005/114959

PCT Pub. Date: Dec. 1, 2005

(65) Prior Publication Data

US 2008/0043634 A1 Feb. 21, 2008

(30) Foreign Application Priority Data

May 18, 2004 (GB) ................... 0411061.5
Sep. 30, 2004 (GB) ................... 0421755.0

(51) Int. Cl.
*H04L 12/28* (2006.01)
*G06F 15/173* (2006.01)

(52) U.S. Cl. ...................... 370/254; 709/223

(58) Field of Classification Search ................ 370/241, 370/252, 465, 468; 709/217, 218, 219, 227, 709/228, 238, 240, 223
See application file for complete search history.

(56) References Cited

U.S. PATENT DOCUMENTS

| 6,505,248 | B1 * | 1/2003 | Casper et al. ............... 709/224 |
| 6,681,247 | B1 * | 1/2004 | Payton ...................... 709/217 |
| 6,765,864 | B1 * | 7/2004 | Natarajan et al. ........... 370/224 |
| 7,133,905 | B2 * | 11/2006 | Dilley et al. ................ 709/219 |
| 2002/0078174 | A1 * | 6/2002 | Sim et al. .................... 709/219 |
| 2003/0195981 | A1 * | 10/2003 | Graf et al. ................... 709/238 |

(Continued)

OTHER PUBLICATIONS

IEEE Xplore: Anthill: a framework for the development of agent-based peer-to-peer systems Babaoglu, O.; Meling, H.; Montresor, A.; Distributed Computing Systems, 2002. Proceedings. 22nd International Conference on Jul. 2-5, 2002 pp. 15-22.*

(Continued)

*Primary Examiner*—Kevin C Harper
*Assistant Examiner*—Xavier Szewai Wong
(74) *Attorney, Agent, or Firm*—Nixon & Vanderhye P.C.

(57) ABSTRACT

A station used as a node in a peer-to-peer communications system keeps a list of stations to which requests for resources may be sent. The list includes for each member a performance parameter. When a station receives a request for resources it selects at least one station from the list and sends a resource request message to it. The selection of the station from the list may be performed by a random or pseudo-random process such that the probability of selection of any station is a function of the stored parameter. A station receiving such a request, for resources that it can itself supply, sends a reply to the originator. When the originator receives a reply it updates the respective performance parameter: the degree of adjustment may vary according to the quality of reply received.

43 Claims, 8 Drawing Sheets

U.S. PATENT DOCUMENTS

| | | | |
|---|---|---|---|
| 2003/0204602 A1* | 10/2003 | Hudson et al. | 709/228 |
| 2004/0098503 A1* | 5/2004 | Zhang et al. | 709/238 |
| 2004/0215602 A1* | 10/2004 | Cioccarelli | 707/3 |
| 2005/0080858 A1* | 4/2005 | Pessach | 709/206 |
| 2007/0002821 A1* | 1/2007 | Carlson et al. | 370/349 |

OTHER PUBLICATIONS

Loss-free handover for IP datacast over DVB-H networks, by May G. Inst. for Commun. Technol., Technische Univ. Braunschweig, Germany; Consumer Electronics, 2005. (ISCE 2005). Proceedings of the Ninth International Symposium; Publication Date: Jun. 14-16, 2005 On pp. 203-208.*

International Search Report for PCT/GB2007/002038, mailed Sep. 24, 2007.

PCT Written Opinion and International Search Report dated Aug. 22, 2005.

Babaoglu et al., "Anthill: A Framework for the Development of Agent-Based Peer-to-Peer Systems", Proceedings of the $22^{nd}$. International Conference on Distributed Computing Systems, ICDCS 2002, Vienna, Austria, Jul. 2-5, 2002, International Conference on Distributed Computing Systems, Los Alamitos, CA, IEEE Comp. Soc. US, vol. Conf. 22, Jul. 2, 2002, pp. 11-18.

Robinson et al., "A Complex Systems Approach to Service Discovery", Databse and Expert Systems Applications, 2004, Proceedings, $15^{th}$ International Workshop on Zaragoza, Spain Aug. 30-Sep. 3, 2004, Piscataway, NJ, USA, IEEE Aug. 30, 2004, pp. 657-661.

Qin et al., "Search and Replication in Unstructured Peer-to-Peer Networks", Conference Proceedings of the 2002 International Conference on Supercomputing, ICS'02, New York, NY, Jun. 22-26, 2002, ACM International Conference on Supercomputing, New York, NY:ACM, US, vol. Conf, 16, Jun. 22, 2002, pp. 84-95.

U.S. Appl. No. 12/302,937, Jakob et al., filed Dec. 1, 2008.

U.S. Appl. No. 12/303,996, Saffre et al, filed Dec. 9, 2008.

International Search Report for PCT/GB2007/002007, mailed Jan. 9, 2008.

Sepandar et al., "The Eigentrust Algorithm for Reputation Management in P2P Networks", 12th International World Wide Web Conference 2003, May 20, 2003, Budapest, Hungary.

S. Marti, "Limited Reputation Sharing in P2P Systems" 5th ACM Conference on Electronic Commerce, May 17, 2004, New York, retrieved from the internet: URL:http://citeseer.ist.psu.edu/garcia04limited.html>.

International Search Report for PCT/GB2007/002038, mailed Sep. 24, 2007.

Julian Day, "Selecting the Best Web Service", 14th Annual IBM Centers of for Advanced Studies Conference, 2004, XP002407853, Retrieved from the internet: http://citeseer.ist.pus.edu/7018012.htm.

Wang et al., "Service Selection in Dynamic Demand-Driven Web Services", Web services, 2004. Proceedings. IEEE International Conference on San Diego, CA, USA, Jul. 6-9, 2004, Piscataway NJ, USA, IEEE, pp. 376-384, XP010708869.

Makris et al., "Efficient and Adaptive Discovery Techniques of Web Services Handling Large Data Sets", Journal of Systems & Software, Elsevier North Holland, New York, NY, US, vol. 79, No. 4, Apr. 2006, pp. 480-495, XP005411719.

Fernandes et al., "Dynamic Inovacation of Replicated Web Services", Webmedia and La-Web, 200., Proceedings Riebeirao Preto-SP, Brazil Oct. 12-15, 2004, Piscataway, NJ, USA, IEEE, pp. 22-29, XP010734853.

Kalepu etal., "Verify: a Qos Metric for Selecting Web Services and Providers" Web information system engineering workshops, 2003. Proceedings. Fourth International Conference on Rome, Italy Dec. 13, 2003, Piscataway, NJ, USA, IEEE, 2003, pp. 131-139, XP010697498.

* cited by examiner

Fig.4.
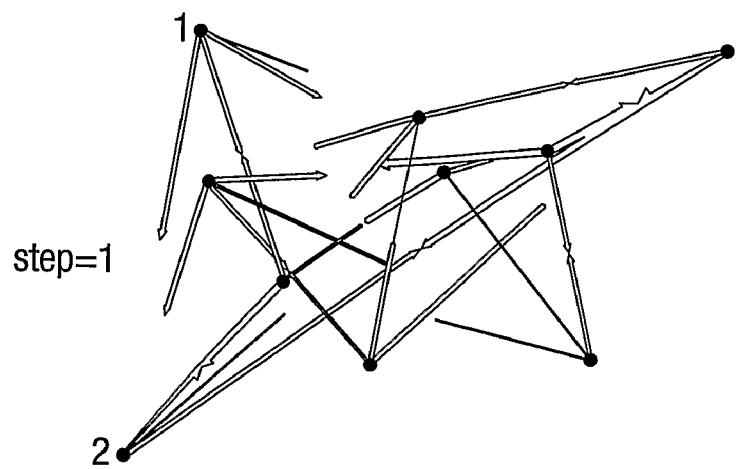
step=1
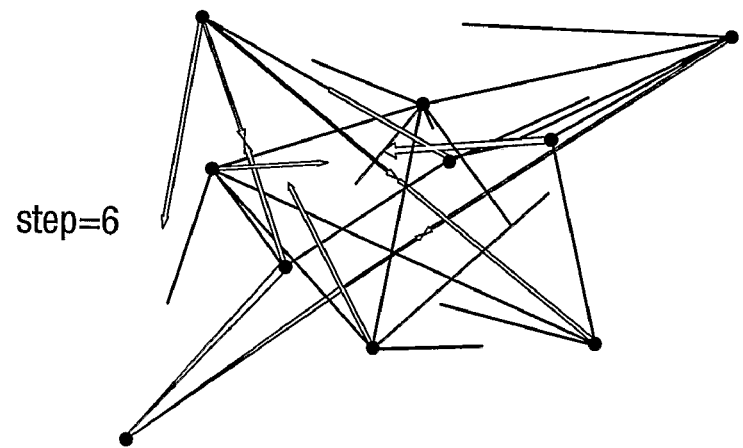
step=6
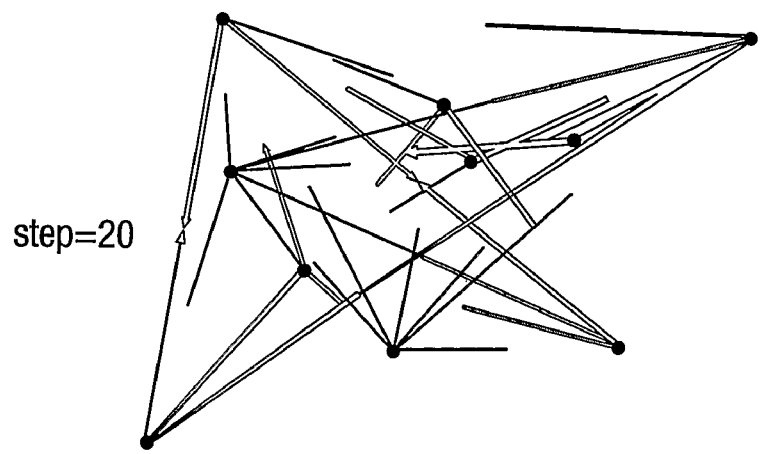
step=20

Fig.5.

Graph showing average message search efficiency $ef_n$ as a function of edge weight decay, and average number of connections per node as a percentage. (Maximum number of connections per node $K_{max} = 50$, average number of nodes = 300.)

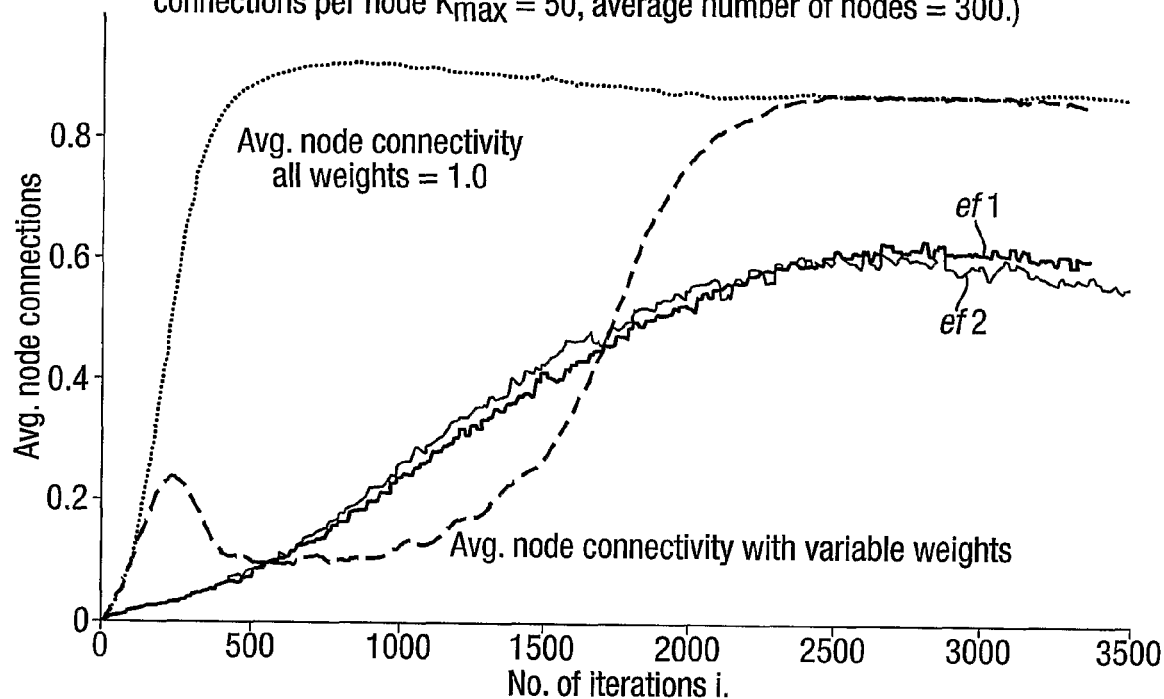

Fig.6a.

SCAN average connectivity ($A_c$) with a targeted attack process starting at t=1000 time steps. Upper dashed curve shows the effect on $A_c$ of no spatial constraint on growth (d = 1.0), lower solid curve shows the effect of a spatial constraint equal d=0.25 of the maximum node spatial separation. ($K_{max}$ =50; growth by preferential attachment; 300 nodes).

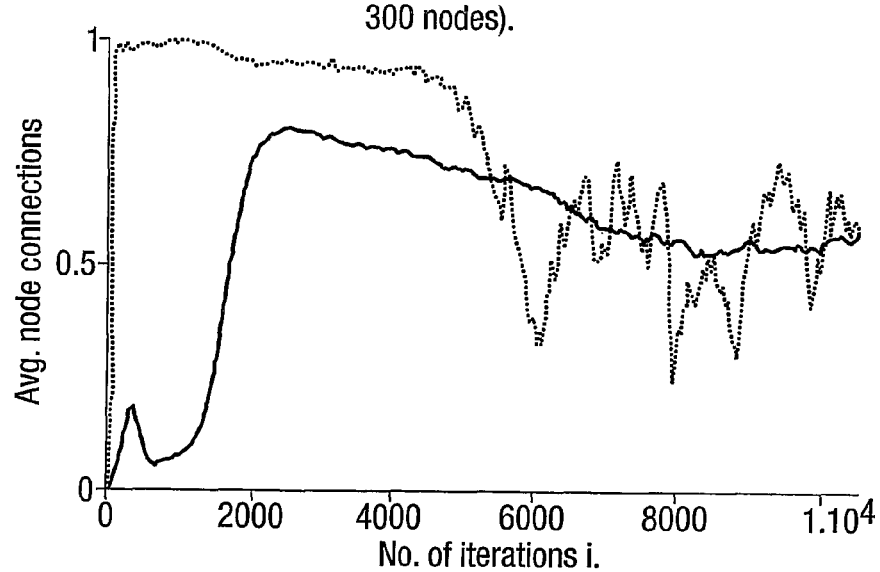

Graph showing average message search efficiency under same conditions as figure 2a.
Upper solid curve is for d = 0.25, lower curve is for d = 0.99.

Evolution of network diameter as a function of communications range (averaged over 10 realizations). Average path length follows a similar curve. [Saffre et al 2004].

Node degree distribution resulting from the SCAN algorithm. (250 nodes, random attrition, $K_{max} = 50$.)

An illustration of the linear decay Rule

PEER-TO-PEER NETWORKS

This application is the US national phase of international application PCT/GB2005/001944 filed 18 May 2005 which designated the U.S. and claims benefit of GB 0411061.5 and GB 0421755.0, dated 18 May 2004 and 30 Sep. 2004, respectively, the entire content of which is hereby incorporated by reference.

FIELD OF THE INVENTION

The emerging Peer-to-Peer (P2P) systems have brought a new way to harness scattered or distributed resources in networks. In P2P systems, distributed nodes, or peers, preserve information about other peers for future remote resource sharing. The associations established between peers create a kind of logical connection of peers and consequently form a peer overlay network on top of the underlying network architecture such as the Internet. P2P systems are dynamic complex systems involving widely spread and continuously changing peers and resources. Hence how to construct useful peer connections, such as to provide a high level of inter-node connectivity and resource availability is a major challenge.

DESCRIPTION OF PRIOR ART

Current P2P systems can be classified into structured and unstructured systems according to the ways in which peer associations are constructed (Lv, Q., Cao, P., Cohen, E., Li, K. and Shenker, S. "Search and replication in unstructured peer-to-peer networks", Proceedings of the 16th international conference on Supercomputing, pages 84-95, 2002.). Structured systems such as Freenet (Clarke, I. and Sandberg, O. "Freenet: A distributed anonymous information storage and retrieval system", ICSI Workshop on Design Issues in Anonymity and Unobservability. California, pages 25-26, 2000.), Chord (Stoica, I., Morris, R., Karger, D., Kaashoek, M. F. and Balakrishnan, H. "Chord: A scalable peer-to-peer lookup service for internet applications", SIGCOMM, pages 149-160, 2002.), Pastry (Rowstron A. and Druschel P. "Pastry: scalable, decentralized object location and routing for large-Scale Peer-to-Peer systems". Proceedings of 18th Conference on Distributed Systems Platforms. Heidelberg, 2001.), Tapestry (Zhao B., Huang, L., Stribling J., Rhea S. C., Joseph A. D. and Kubiatowicz J. "Tapestry: A resilient global-scale overlay for service deployment", IEEE Journal on Selected Areas in Communications, 2003.), and P-Grid (Aberer, K., Cudré-Mauroux, P., Datta, A., Despotovic, Z., Hauswirth, M. and Punceva, M. "P-Grid: A Self-organizing Structured P2P System", ACM SIGMOD Record, 32(3), September 2003.) have pre-defined network topologies and resource placement schemes. Peers in these systems are assigned static identifiers and routing tables based on identity distances which are distributed onto some if not all of the peers. Though heuristic information is used in Freenet for resource allocation and P-Grid for peer path maintenance, the underlying network structures of these two systems are precisely determined. In structured P2P systems peers are well organised and resource search is relatively straightforward, but substantial knowledge and experience are required for system design and this is always at a cost of increased maintenance to deal with various changes caused by peers/resources joining and leaving. Meanwhile, pre-defined network topologies in structured P2P systems usually restrict the choice of applicable search protocols and applications of the systems to only those that satisfy certain design requirements.

In contrast to structured systems, unstructured P2P systems have no global control or layout of the whole system. Peers in unstructured P2P systems discover and establish their associations spontaneously in real time. The formation of the overlay network is therefore decentralised and self-organising. In Gnutella, for example, nodes self-organise into an overlay network with power-law degree distribution. In Anthill, peers connect to other relevant peers (called neighbours) or remove connections to neighbours that are no longer reachable according to the instantaneous information discovered by a special kind of ant agent during a search for resources. In consequence unstructured P2P systems require less prior knowledge or pre-design of the systems because they organise peers adaptively and autonomously. The resulting overlay networks are also relatively resilient to dynamic changes of nodes and resources presented in the systems. However, the current unstructured P2P systems treat all peer connections the same (that is, all connections have the same strength) despite their different relationships and conditions, the search of resources is therefore more or less blind. For example, the search process in Gnutella is a type of broadcasting, which normally causes message flooding over the network. Anthill adopts a search strategy similar to Freenet, again based on predefined peer identifiers. This inevitably affects the achievement of an efficient and effective sharing of distributed resources on the network.

SUMMARY OF THE INVENTION

According to the present invention there is provided a station for use as a node in a peer-to-peer communications system, comprising:

communication means for communicating with other such stations;

storage for storing a list of stations to which requests for resources may be sent, said list including for each member a performance parameter;

control means operable (a) in response to a request for resources to select at least one station from the list and send a resource request message to it;

(b) in response to a reply to update the respective performance parameter;

(c) in response to receipt of a request for resources that it can itself supply to send a reply to the originator;

wherein the selection of the station from the list is performed by a random or pseudo-random process such that the probability of selection of any station is a function of the stored parameter.

In another aspect, the invention provides a station for use as a node in a peer-to-peer communications system, comprising:

communication means for communicating with other such stations;

storage for storing a list of stations to which requests for resources may be sent, said list including for each member a performance parameter; control means operable (a) in response to a request for resources to select at least one station from the list and send a resource request message to it;

(b) in response to a reply to update the respective performance parameter;

(c) in response to a request for resources that it can itself supply to send a reply to the originator;

including means operable upon receipt of a reply to a request for resources to assess the quality of the reply and to adjust the parameter by an amount dependent on said quality.

Other, preferred, aspects of the invention are set out in the claims.

BRIEF DESCRIPTION OF THE DRAWINGS

Some embodiments of the invention will now be described, by way of example, with reference to the accompanying drawings, in which:

FIG. 4 shows diagrams illustrating the results of a test on a network of such stations;

FIG. 5 shows average message search efficiency as a function of edge weight decay and the average number of connections per node;

FIG. 6a shows how the average connectivity of the system in response to a targeted attack varies according to the system's growth constraint;

FIG. 6b shows the average message search efficiency under the same conditions as in FIG. 6a;

DETAILED DESCRIPTION OF EXAMPLE EMBODIMENTS

In this description reference will be made to computing nodes that have processing, storage and communication capabilities. A computing node can be a computer or other device, or—noting that a single computer may have a number of independent programs or processes running on it—may be such a program or process.

This description assumes that each computing node is connected to some communication infrastructure which could for example be a telecommunications network such as an IP (internet protocol) network, so that it can send messages and messages can be sent to it. The invention finds application both in wired and wireless networks. Thus, each computing node also constitutes a node within the communications infrastructure.

Figure 1:
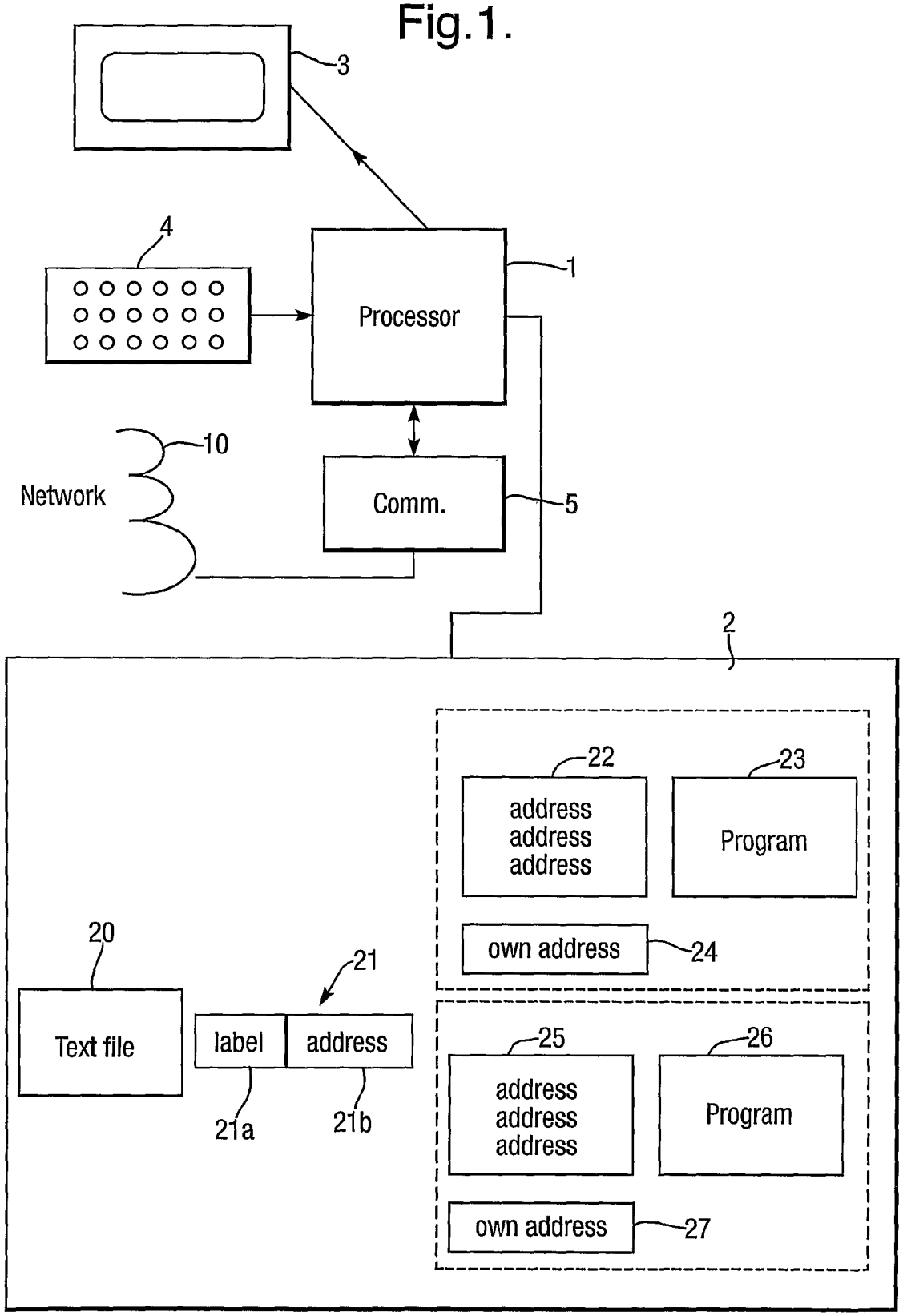
FIG. 1 is a block diagram of a station for use in a peer-to-peer network.

An example is shown in FIG. 1. A computer has the usual components, namely a processor 1, memory 2, display 3, keyboard 4 and a communications interface 5 for communication via a network 10.

The memory 2 contains operating system and other programs (not shown), and data files such as the text file 20 shown.

As discussed in the introduction, a node will establish associations with other nodes. Sometimes these are referred to as virtual connections. Thus the node shown in FIG. 1 has an address list 22 for storing the addresses of other nodes to which such an association has been established. A control program 23 is also shown.

Since the object of a peer-to-peer network is to promote the sharing of resources, such networks embody a mechanism whereby a request for a resource may be sent to a node, which then either provides the requested resource, or forwards the request to another node. A "resource" can be in principle anything that a node possesses, or may possess, which could be useful to another node, for example: documents, MP3 files, processing ability, memory or other storage. The nature of the resource is not material to the present invention.

Thus the control program 23 is operable upon receipt of a request for a resource—which request may be generated locally, or be a message received from another node, to determine whether the node is able to satisfy the request; if so, to transfer control to a program for servicing the request; and if not, to forward the message to another node (or nodes). This process is well known and will not be described in detail, except as regards the determination of which node(s) to forward the message to. Note however that commonly, to avoid excessive propagation of messages the message will contain a "time-to-live" parameter: the node receiving it decrements the parameter and forwards it only if the parameter remains non-zero.

The purpose of the associations recorded in the list 22 is to provide a list of other nodes known to be useful to the node. Thus, when a request message is to be forwarded, it is sent to one or more of the nodes whose addresses are recorded in the list. In the node shown, the list 22 also contains for each entry, a weight or strength w indicative of the value or utility of the associated node whose address is in that entry. We will refer to the weight of an association, or virtual connection, from node i to node j as $w_{ij}$. That is, a large value of $w_{ij}$ indicates that node i has found node j to be useful in the past in servicing requests for resource. The converse does not necessarily apply, so it is not in general the case that $w_{ij}=w_{ji}$. Indeed, if node j does not have an association to node i, $w_{ji}$ will not exist. Thus, the linkage is "directed". Sometimes $w_{ij}$ may be written w(ij) where this is notationally more convenient.

Firstly, we will describe how these values are used, and then explain how they are created and updated. The question of whether the request message is to be forwarded to one or more than one node (and if so, to how many) can be determined as in conventional systems. For the purposes of the present description, it is taken as given that it is to be forwarded to p out of a total of N associated nodes recorded in the list 22, where $1 \leq p < N$. Note, however, that use of the Dynamic Growth rule and the growth constraint, as described below, modify this generality.

We will also refer to the weight of entry n in the list as $w_n$, it being understood that $w_n = w_{ij}$ where i is the index of the node shown in FIG. 1 and j is the index of the node whose address is contained in the entry n of the list 22.

One possibility is simply to select the p entries having the largest values of $w_n$. However, we prefer to introduce a random element, that is, an entry is selected from the list with a probability of selection proportional to w. One method of doing this is Select a random or pseudo-random integer r in the range 0 to R-1 (R=65536, say);

Find the value of x for which $$\frac{\sum_{n=0}^{x-1} w_n}{\sum_{n=0}^{N} w_n} \leq \frac{r}{R} < \frac{\sum_{n=0}^{x} w_n}{\sum_{n=0}^{N} w_n}$$

Forward the request to the node whose address is given in entry x of the list.

This process can be repeated until the message has been forwarded to p destinations.

Turning now to the associations and accompanying weights, the nodes follow Hebbian learning to construct a flexible and resilient peer network. The learning process includes:

creation of new connections elimination of connections changes in the connection strengths or weights A connection weight $w_{ij}$ indicates the connection (or association) strength from node i to j. Based on the above strength definition, the connections are adjusted by following a set of rules: the frequency rule, feedback rule, symmetry rule, decay rule, new node rule and connection removal rule.

We use variable and dynamic weights to edges between nodes. We enable each node to assign a floating point weight value to all of the edges to other agents or systems. In this model an edge is defined as any channel or interaction mechanism that exists between two or more agents. Of course the reason why weighted graphs have received less theoretical study is precisely because they can exhibit complex dynamic behaviour, including resonance, oscillation, chaos and +/− feedback. This factor must be considered when attempting to utilise a weighted network mechanism as advocated here. In the analysis section of this application we make a comparison of the dynamics exhibited by our simulation with the dynamical behaviour of a reference nonlinear model i.e. the Ising model [Cipra 1987]. This model shares many key features, such as spatially coupled modes of local interaction, and aggregation. The following section outlines the details of the adaptive edge weight algorithm we have developed.

Synaptic Connection Adaptive Network Algorithm

The concept of using a dynamically updated edge weight between nodes appears to be a novel solution to the problem of managing the search efficiency and growth of unstructured P2P networks. There are several aims behind this idea. First we would like to reduce the level of messaging traffic in the overlay network as this can be a significant overhead especially in unstructured P2P systems [Ripeanu et al 2002]. Secondly, the aim is to enable the network to learn useful routes to resources. Generally edges to nodes with low utility resources are pruned over time; hence a node only maintains edges to nodes that consistently return useful results. The algorithm therefore maintains a form of autonomic connectivity between distributed peers.

Frequency Rule

This rule is deployed when a node j provides required resources to a requesting node i. The strength of the connection from node i to j is then updated according to equations (1) and (2):

$$w_{ij} = w_{ij} + \Delta w_{ij} \quad (1)$$

$$\text{where } \Delta w_{ij} = \gamma \cdot x_i \cdot x_j \quad (2)$$

where $\gamma$ is the learning rate, $x_i$ is the output of node i which sends a request for a particular resource. It has a value of 1 from time t when the request is sent to time t+T and 0 otherwise. $x_j$ is the output of node j replying to the request sent. If node j provides search results within a time period T, its output is 1 from time t' when node j sends the results to node i to time t'+T. Otherwise, $x_j$ has a value of 0.

The learning rate is defined as:

$$\gamma = \begin{cases} q \cdot \left(1 - \frac{\tau}{T+1}\right) \cdot \sigma & \tau \leq T \\ 0 & \tau > T \end{cases} \quad (3)$$

where $\tau$ is the time spent for searching a resource, $q \in [-1,1]$ is the value (or quality) of the resource provided (discussed below) as determined by the receiving peer. T is a constant indicating the maximum time period allowed for the search. $\sigma$ is a learning parameter.

During search, if node j cannot find a suitable result regarding a request, it will forward the request to one or more nodes connected to it. If no solution is found in time period T or a maximum number of forwarding steps F, the search is terminated. If desired, the failure information can be sent back to the original requesting node, but this is not essential. If a failure message is sent to the original requesting node i, node i may do nothing (i.e. no weight update) or update weights via feedback and symmetry rules by giving a negative value (e.g. −1) to q and a zero value to $\Delta \omega_{ij}$. If a solution is found within a limited number of steps F, the connections from the original requesting node i to node k providing the resource will be strengthened in accordance with Equations (1) and (2) (with k written instead of j). Note that the time $\tau$ in equation (3) is the time from the issuance of the original request message from node i to receipt by node i of a response from node k. A new connection will be constructed from node i to k if they had no link before and the initial strength of the connection is:

$$w_{ik} = \Delta w_{ik} \quad (4)$$

It is worth noting that the frequency rule will reduce the connection strength if the value q of the resources provided is negative to node i, that is, the resources provided are not relevant to the search. A connection will be eliminated if its connection strength is below zero or a very small value $\epsilon$ (e.g., $\epsilon = 0.001$), as shown in the connection removal rule which is discussed below.

Feedback Rule (Optional)

When a successful resource search request passes via one or more intermediate nodes, all the nodes contributing to the search may update their associations involved, once the original requesting node has evaluated the resource provided. The evaluation information works like feedback to re-examine the strengths of the connections involved. The feedback may be positive or negative depending on whether the resources provided are useful. Equation (5) describes the feedback rule.

$$w_{kl} = w_{kl} + \eta_f \cdot \Delta w_{ij} \quad (5)$$

$\eta_f$ is a parameter to fine-tune the feedback rule, k is any node involved in the search except j and l is the node to which the search request was forwarded by node k. Thus, if a request from node i is forwarded in succession to nodes a, b, c and then j, then $w_{ia}$, $w_{ab}$, $w_{bc}$ and $w_{cj}$ are updated in accordance with this rule Symmetry Rule (Optional)

This rule is based on the assumption that if node i is related to node j, then node j is possibly related to node i. The symmetry rule is triggered to enforce the inverse link $w_{ji}$ after $w_{ij}$ is updated, but at a smaller degree. This rule is described as follows.

$$w_{ji} = w_{ji} + \eta_s \cdot \Delta w_{ij} \quad (6)$$

where $\eta_s$ is a parameter to fine-tune the symmetry rule.

Where an adjustment to $w_{kl}$ is required by the feedback rule, the symmetry rule may then be invoked to make an adjustment to $w_{lk}$.

If the feedback rule (or symmetry rule, if used) implies adjustment of a weight for an association that does not currently exist, a new entry is added by following equation (4). The old value is taken to be zero.

In addition to the above adjustment rules of weights, the system possesses a decay rule to simulate decaying connectivity over time.

Decay Rule

In the absence of any stimulus, the weight of a connection from one node to another will decay over time. The decay rate can be simulated as the leakage current of a capacitance $$w_{ij}(s+1) = w_{ij}(s) \cdot \exp\left(-\frac{s}{\eta_d}\right) \quad (7)$$

where $\eta_d$ is the decay rate and s is the time measured from the point at which at which the last update in accordance with Equation (1), (5) or (6) occurred.

or simply as a linearly regressive function which can be expressed (if t is measured in milliseconds) as $$w_{ij}(t+1) = w_{ij}(t) \cdot \eta_d \quad (8)$$

where $\eta_d$ is a constant between [0,1].

A weight $w_{ij}$ can be considered as 0 if $w_{ij}$ is below 0 or a small value $\epsilon$ (e.g. 0.001). The connection from node i to j will be removed from the system if its weight falls below the value $\epsilon$.

There is also a new node rule and a connection removal rule in order to deal with node coming and leaving in the network.

Figure 9:
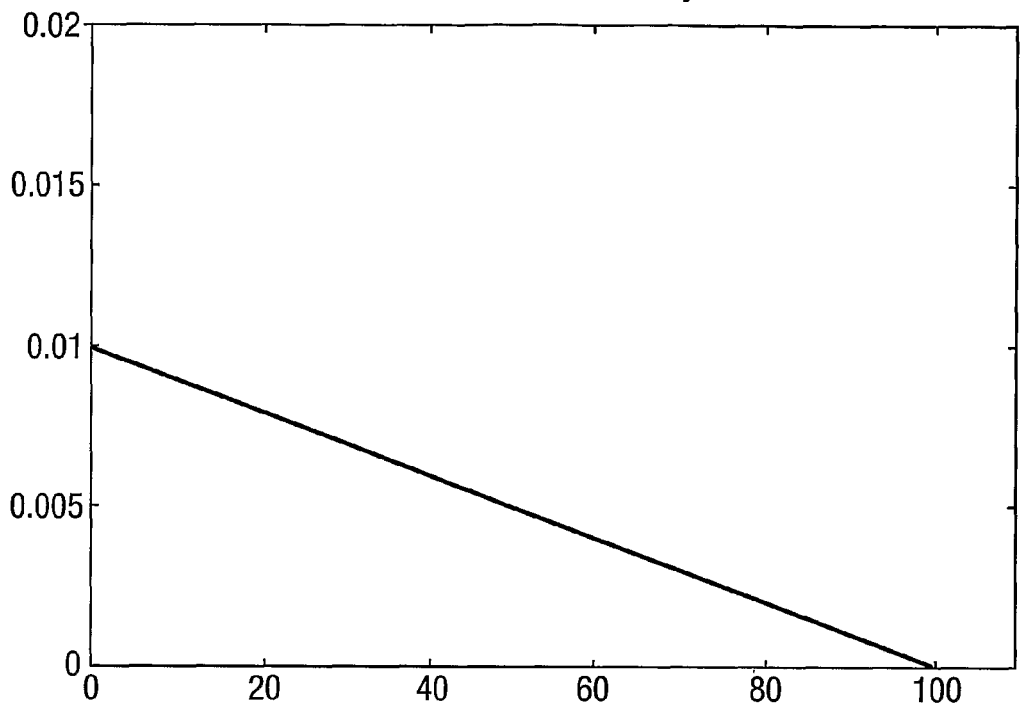
FIG. 9 illustrates a linear decay rule.

FIG. 9 gives an illustration of the linear decay of a connection strength when $w_{ij}(s=0)$ is 0.01, $\eta_d$ is 0.1 and s is sampled every millisecond.

It can be seen that $\eta_d$ is a very sensitive parameter that determines the decay degree of a peer connection. If $\eta_d$ is set too high, it is possible that the network is disconnected before the necessary associations are established between peers. On the other hand, too low a value of $\eta_d$ will take longer time to remove unnecessary peer associations. $\eta_d$ therefore is one of the factors that determine the convergence rate of the network. As the size of a peer network is usually very dynamic and unpredictable, with the number of peers ranging from tens to millions, it is difficult if not impossible to decide a single (unique) value of $\eta_d$ to suit all P2P networks.

Figure 10:
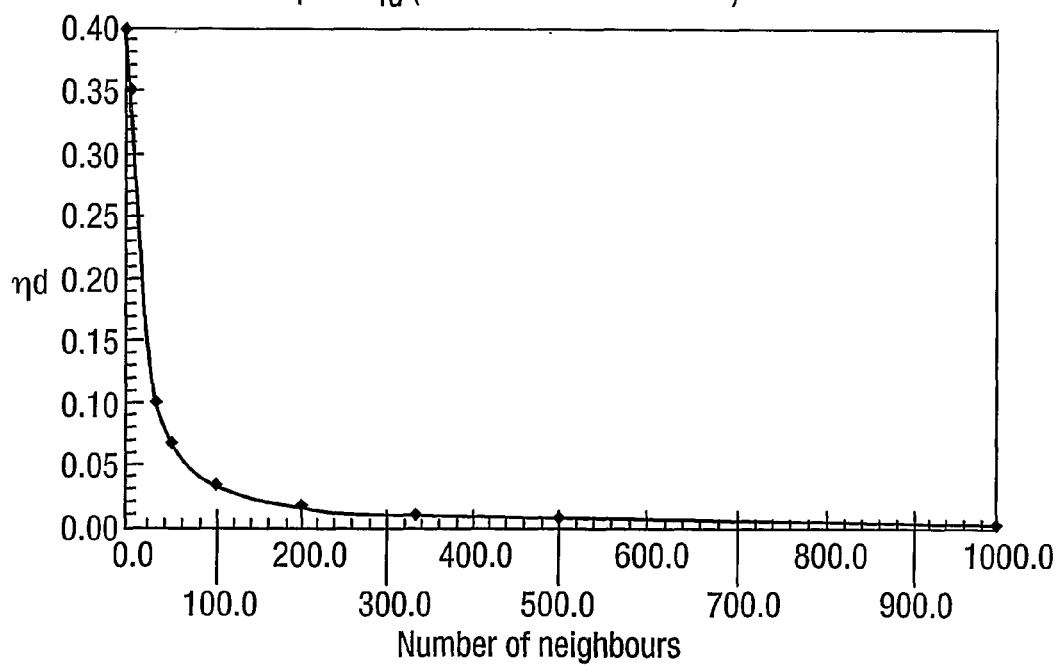
FIG. 10 illustrates the effect of an adaptive decay rule.

In order to implement autonomic and scalable P2P social networks, we adopt an adaptive decay rate $\eta_d$ that adapts to varied network sizes. This adaptation is achieved in a decentralised way, based only on the local information of each agent, i.e., the number of neighbours it currently connects (i.e. the number of stations in its list of stations). The adaptive decay rate of peer i is defined as:

$$\eta_d(i) = \frac{n_i}{a + bn_i - cn_i^2} \quad (9)$$

where $n_i$ is the number of present neighbours of peer i. So peers with fewer neighbours will have a smaller $\eta_d$ and hence a faster decay rate, whereas peers with more associations will have a slower decay rate so that they will have more time to find correct connections. If an agent establishes more connections, the decay rate for its connections will become slower and vice versa. While all nodes adapt their connections collectively, the whole system will stabilise to a suitable social structure within reasonable time, despite the network size. FIG. 10 illustrates the adaptive $\eta_d$.

In addition to adaptive $\eta_d$, a deviation strategy is designed in the adaptive decay rule in order to accelerate convergence. This strategy is especially helpful when a number of valuable associations have been discovered so that less useful associations with comparatively low strengths can be removed from the neighbourhood of a peer. Classical methods to detect outliers in a set of data include Inter-Quartile-Range (IQR) computation, Grubb test and Z- or Q-test. We propose an association $w_{ij}$ will be removed if there exists a neighbour l and the quotient $w_{il}/w_{ij}$ is larger than a value $\kappa$, that is, $$w_{ij}=0 \text{ if } \exists l(l \neq j) w_{il}/w_{ij} > \kappa \quad (10)$$

The combination of the adaptive decay rate $\eta_d$ and deviation detection makes the adaptive decay rule scalable to varied network scales while maintaining a reasonable convergence rate, as verified in the following experiments. Of course, the deviation strategy could be used as a way to "prune" less useful connections even without the use of any form of decay, it could also be used with a linear rarther than an adaptive decay method.

New Node Rule

This rule is applied when a new node joins the network. In order to join the network, this node should make connections to at least one node already existing. This node can be a node known to the new node before, or some major nodes whose information is bootstrapped by the system.

The new connections between the new node i and an existing node j are given a default value of weight if the usefulness of these two node is yet unknown to each other, that is, $$w_{ij}=\eta_0 \text{ and } w_{ji}=\eta_0 \quad (11)$$

The weights, however, will be updated in the future through resource sharing. The new node also may establish new connections to other nodes via the Frequency rule, Feedback rule and Symmetry rule.

The following values of those parameters are recommended:

| | |
|---|---|
| T | 1 second or 7 hops if the Time To Live is measured by hops |
| $\sigma$ | 0.25 |
| $\eta_f$ | 0.25 |
| $\eta_s$ | 0.05 |
| $\eta_d$ (eq. 8) | 100 |
| $\eta_d$ (eq. 9) | 0.995 |
| $\eta_0$ | 0.1 |
| $\epsilon$ | 0.001 |

Connection Removal Rule

If a node j is found no longer reachable when node i forwards a search request to it, the connection from i to j will be removed from the network.

As mentioned before, if the weight of a link from node i to j is below 0 or a small value $\epsilon$ (e.g. a value of 0.0001), this link can then be removed from the network.

Because the node connectivity is adjusted according to information discovered during run time, the nodes constitute a network adaptive to continuous changes with flexible connection strengths reflecting node utilities. This kind of network formation is self-organising and autonomic, in contrast to other P2P systems that require intensive pre-design work or periodic updates between nodes that places an additional workload on the network.

Resource Search Protocol

Figure 2:
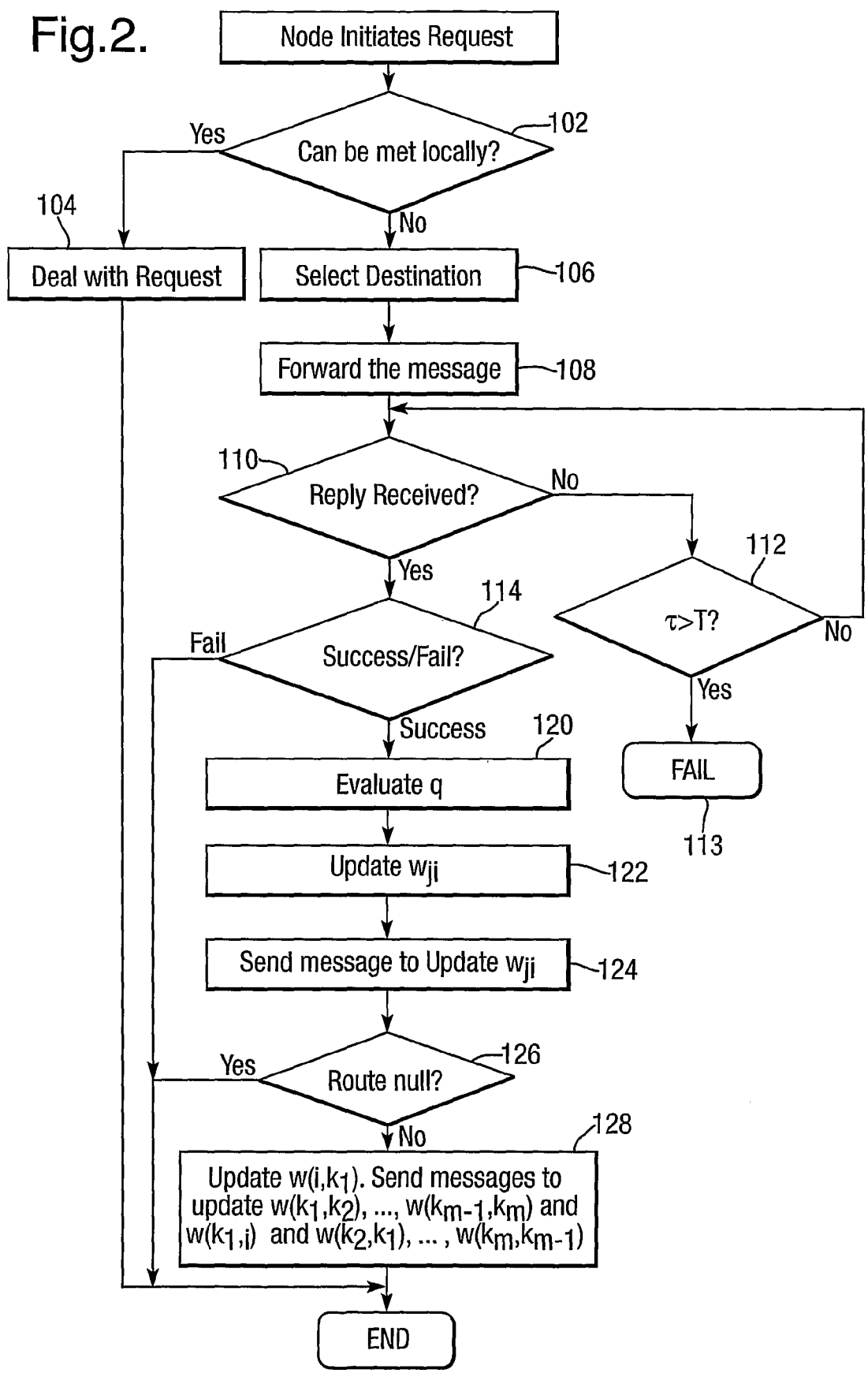
FIGS. 2 and 3 are flowcharts explaining the operation of such a station.
Figure 3:
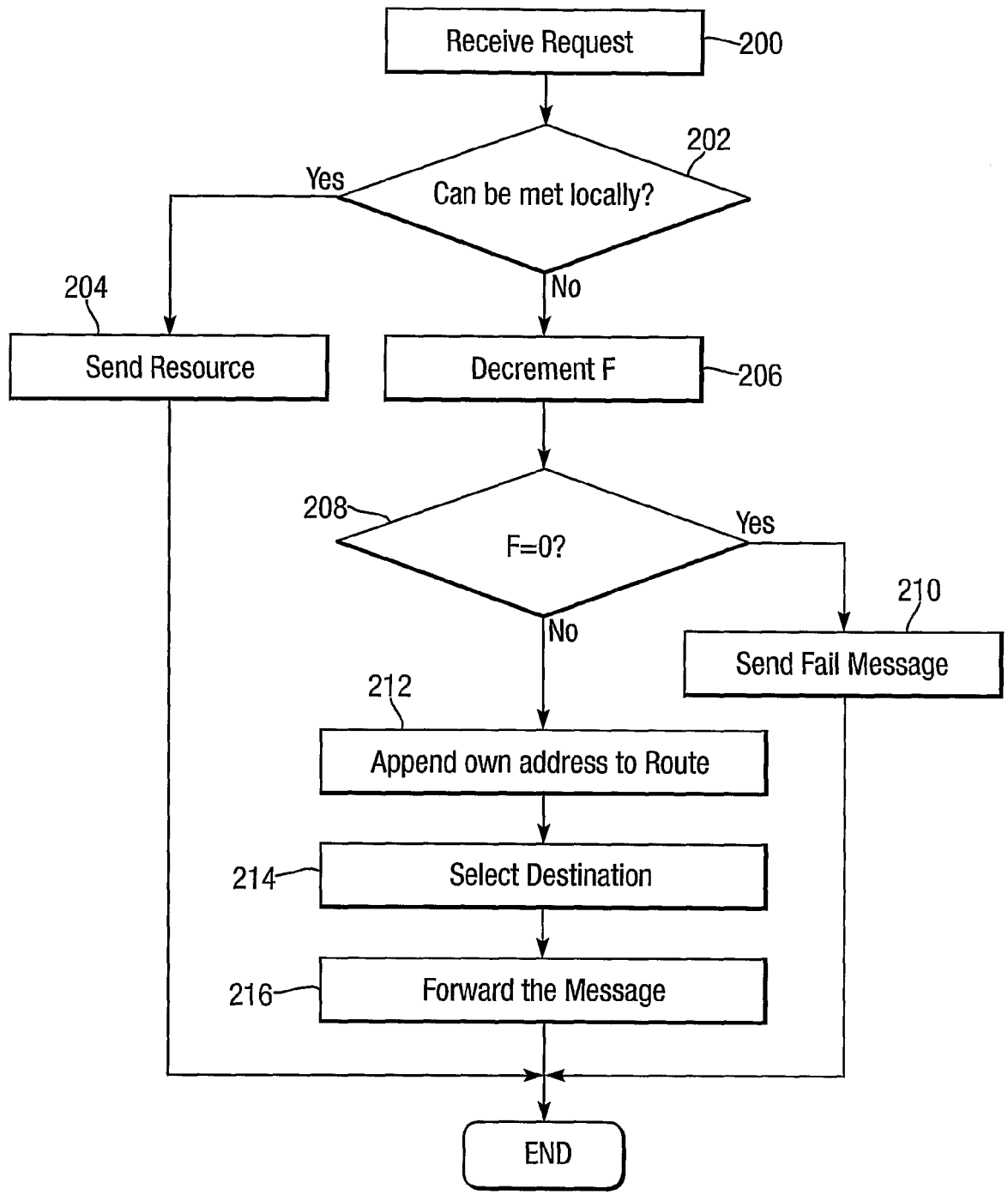

By following the above maintenance protocol, the nodes form a time-varying, weighted network in which the connections indicate the correlativity or usefulness of the nodes to each other. Based on this network, a wide range of search protocols can be used to search resources held by distributed nodes. A preferred implementation will now be described with reference to the flowcharts of FIGS. 2 and 3 which show the operations performed by the control program 23. FIG. 2 shows the steps performed by a node initiating a request, which FIG. 3 shows the steps performed by a node to which a request has been forwarded. It will be understood that each node possesses the functionality of both flowcharts.

When a node A initiates a request at Step 100, FIG. 2, it first checks (102) whether it can deal with it itself, and if so, it does so at Step 104. If it cannot, then the request is sent to one or more neighbouring nodes for the desired resources. The selection of the neighbouring nodes is based on their varying strengths from node A by following the selection rules discussed above, so that those nodes to which node A has stronger connections will have a higher probability of being selected. The number of the neighbouring nodes selected may vary according to specific applications. For simplicity, this example assumes that the request is forwarded to only one node at a time. Thus, at Step 106, the destination node is selected and at Step 108 the request message is forwarded. Typically the format of the request message might be:

| Field name | Contents | Explanation (not part of the message) |
|---|---|---|
| Type | REQUEST | type of message |
| Source | $a_A$ | address of the node sending the message |
| Destination | $a_B$ | address of the node to which the message is sent |
| Route | | initially blank |
| Hop count | F | |
| Request | Send file filename | details of the request |

Supposing that the message is sent to node B, then node B receives the request at Step 200 of FIG. 3. After receiving the request, the neighbouring node B examines (202) its own repository to see if it has the required resources. If it has, a reply message with the desired resources is, at Step 204, sent back to node A and the search is successful.

If node B does not have the required resources, it decrements, at Step 206, the hop count F. If (208) this has reached zero (because the message has already been forwarded F times) it sends a fail message at Step 210 (as noted above, this is optional). Otherwise it appends its own address to the route field of the message at 212 and then, in Steps 214, 216, forwards the request to one of more of its neighbours in the manner described above for Steps 106, 108 of FIG. 2. Assuming that the message is forwarded to node C, then node C receiving the request will examine its repositories in response to the request, just as has just been described for node B. The process is repeated until the required resources are found (indicating a search success) or a non-forwarding criterion is met (indicating a search failure). The non-forwarding criterion is defined as that a request can only be forwarded as many as F steps.

Returning to FIG. 2, the originating node A, having sent the request message enters a loop waiting for a reply. During this period it increments a timer (not shown) so that the variable $\tau$ indicates the length of time that has elapsed since the request message was sent. Thus in Step 110 it repeatedly tests whether a reply has been received. If the original requesting node A does not receive any feedback from other nodes within a time period T, this is recognised at Step 112 and it will declare (113) that the search has failed. Assuming that a reply is received, then it is determined (114) whether the message is a failure message (generated by another node at Step 210 of FIG. 3), or a successful response from step 204. Naturally if Step 210 is omitted, Step 114 becomes unnecessary. In the event of a failure message, the process terminates. If, however, more than one request were sent (p>1) then control would instead revert to Step 110 to await a possible further reply.

When a successful reply is received, the strengths of all the node connections involved in the search are updated according to the maintenance protocol. In the event of multiple requests (p>1) however it would be appropriate firstly to return to Step 110 to await any further replies (in that case the YES exit from Step 112 and the FAIL exit from 114 would lead to Step 120). At Step 120, an evaluation is made of the value of the results, to produce a value q in the range −1 to +1. The way in which the response is evaluated will depend, of course, on the nature of the original request.

For example, if the originating node asks for 10 documents related to P2P networks, and a node provides it with 7 relevant documents, then the quality of the result can be defined as 0.7. A negative value of q can be assigned in the case that irrelevant documents are returned.

In another example, suppose that a node asks for a single best document about P2P, and a node provides one document which it thinks best. The originating node may think this document is useful but not the best so decide the usefulness of the document is 0.75 according to its satisfaction.

In a third example, suppose that the node asks for one particular document, and the replying node doesn't have this document but has a similar document and send that instead. The originating node may think it is useful by giving it a q of 0.75 or totally non-useful by giving q a value of −1.

In more comprehensive cases, the value of q can even reflect the transmission quality of the resources. For example, if the replying node sends a large multimedia file (e.g., a MP3 file or a movie in .rm format), the requesting node may give it a higher q (0.8) if the file is sent within a few minutes or a lower q (0.5) if the file is sent within hours. The transmission quality is affected by network conditions such as bandwidth of the replying node and the distance between the two nodes. The update process will be described on the assumption that the successful response was generated by node C. At Step 122, the weight $w_{AC}$ is updated in accordance with equations (1), (2) and (3), as described above, with i=A, j=C.

At Step 124, The symmetry rule is invoked by sending a message to node C, containing the value of $\Delta w_{AC}$, instructing it to update its value for $w_{CA}$ in accordance with Equation (6) (with i=A, j=C).

Assuming that the Route field of the reply message is still empty, then the process is complete. However if it is not, then further updates are required, in accordance with the feedback rule of Equation (5), and (in consequence) further updating in view of the symmetry rule. In this example, this is recognised at Step 126 and the Route field will identify node B as the intermediate node and therefore (Step 128) node A will update its weight $w_{AB}$ and instruct node B to update its weight $w_{BC}$. It then (in accordance with the symmetry rule) instructs node B to update $w_{BA}$, and instructs node C to update $w_{CB}$. The necessary messages sent by node A to node B or C instructing updating in accordance with Equation (5) or (6)

will of course contain the relevant value $\Delta w_{ij}$ and indicate whether it is a feedback or symmetry update. Of course, $\eta_f \cdot \Delta w_{ij}$ (or $\eta_{f \cdot \Delta wij}$) could be sent instead if preferred. The node receiving it reacts by performing the update using the appropriate equation (this is not shown in the flowchart). In the more general case, where the request passes via more than one intermediate node, suppose that the request comes from node i and then goes via node $k_1, k_2, k_3 \ldots$ until it reaches $k_M(=j)$ (so naturally M>=2 if box 128 is reached by the flowchart) then (at Step 128) the local node i updates $w(i,k_1)$, and sends messages to update $w(k_1,k_2), \ldots, w(k_{M-1}, k_M)$ and further messages to update $w(k_1,i)$ and $w(k_2,k_1), \ldots, w(k_M, k_{M-1})$.

Note that in the case p>1, it would be possible to count the number of replies received at Step 114, and in the event of p replies being received, terminate the waiting 110/112 prior to the expiry of the timeout period T.

Experimental Tests

The algorithm's ability to form correct peer network structures was verified by a set of simulation experiments. In the experiments, peers were initially connected in a random fashion. The system then learned the correct connections of peers in a few steps by establishing new useful connections and the removal of low quality connections. As learning proceeded, peer requests were answered with an increasing success rate. The final success rate reached 100%, that is all requests were answered correctly, when peer networks were correctly formed.

FIG. 4 shows an example of the learning of the correct structure of a P2P network. In this example, there are 10 peer nodes in total. At step 1, shown in the uppermost drawing of the Figure, the nodes are arbitrarily connected. The arrow from node 1 to node 2 means a connection from node 1 to 2. The width of the arrow indicates the strength of the connection. That is, the bigger an arrow is, the higher the connection strength is. Because there is no connection from node 2 to 1, the other half of the line between nodes 1 and 2 is blank.

As learning proceeds, the peer network is adjusted continuously. Accordingly, node connections that were unrecognised before are discovered and some node connections that shouldn't exist are removed. Moreover, the strengths of node connections are corrected to reflect the real strengths between nodes. The middle drawing in FIG. 4 shows the peer network formed after 6 learning steps. The peer network shown in the last picture of FIG. 4 is the final and correct network which is obtained after 20 learning steps.

Table 1 shows the results of one learning test of a 10-node network. In each step every node initiates a query. That is there are 10 queries in total at each step. As Table 1 shows, in 10 queries, only 3 of them are answered successfully while the other 7 result in failure. Meanwhile, there are 15 extra connections that should not exist in the network and 20 connections are missing. When learning proceeds to step 10, the peer network is nearly correctly formed, with 9 extra links and one link missing. The user queries, at this stage, however, are all processed successfully. After 20 learning steps, not only are the queries all answered satisfactorily, but also the peer network reflects the actual peer connections.

The system described proposes a novel approach to the construction of peer network structures. The network is constructed in real time and in a decentralised and collaborative manner to process information plastically and flexibly. A node (or peer) is able to establish connections to other nodes and the connections are adjusted automatically by the nodes themselves according to current information regarding the network environment.

Specifically, the creation of new connections, removal of existing connections and modification of connection strengths follows Hebbian learning, which is used to adjust node connections and their weights (connection strengths). These weights represent the correlation of the nodes' utility in respect of resource sharing. The connection strength also reflects the quality of resources that can be obtained from a node. This is affected by a number of factors. In a network environment, the factors usually include data transmission bandwidth and speed, node work load, and value of delivered resources. The information of connection strengths is then used for resource search by deciding the most suitable route to forward a resource request.

Due to the adoption of Hebbian learning, the nodes autonomously form their networks without central control and the formed networks are adaptive to changing node conditions and addition or deletion of nodes in the network. Another benefit of Hebbian learning (which is unsupervised learning), is that nodes adjust their connections according to instant feedback from resource sharing results. By learning through experience, the nodes establish connections to other useful nodes with appropriate weighted strength. This is implemented in a decentralised manner without global control or extensive or regular examination of the information of other nodes, such as their workload and bandwidth; as is often the case in unstructured P2P systems. Resource allocation can therefore be achieved with greater efficiency in terms of both communication and computational cost.

Dynamic Growth Rule

A further connection rule that can be applied to increase the resilience of the resulting network is for each node to repeatedly build a new link to neighbouring nodes (that is to add these new nodes to its list of nodes), until it has acquired a specified maximum number of links ($k_{max}$). Each link is made using a preferential attachment rule, i.e. based on the degree of connectivity of the target node (so that in general a node is more likely to select a target node that has lots of connections rather than one with few connections). This requires that nodes know of the existence of other nodes, and their connectivity, even though the other nodes are not in the node's list of nodes. This could be achieved by periodic broadcasting of node identity and connectivity, or historic (and therefore

| Step | Number of successful queries | Number of failed queries | Number of extra links | Number of missing links |
|---|---|---|---|---|
| 1 | 3 | 7 | 15 | 20 |
| 2 | 5 | 5 | 13 | 15 |
| 3 | 4 | 6 | 12 | 9 |
| 4 | 8 | 2 | 11 | 7 |
| 5 | 8 | 2 | 11 | 5 |
| 6 | 10 | 0 | 10 | 6 |
| 7 | 10 | 0 | 10 | 2 |
| 8 | 10 | 0 | 9 | 2 |
| 9 | 9 | 1 | 9 | 2 |
| 10 | 10 | 0 | 9 | 1 |
| 11 | 10 | 0 | 9 | 1 |
| 12 | 10 | 0 | 9 | 1 |
| 13 | 10 | 0 | 8 | 1 |
| 14 | 10 | 0 | 7 | 1 |
| 15 | 10 | 0 | 6 | 1 |
| 16 | 10 | 0 | 4 | 1 |
| 17 | 10 | 0 | 3 | 1 |
| 18 | 10 | 0 | 3 | 0 |
| 19 | 10 | 0 | 2 | 0 |
| 20 | 10 | 0 | 0 | 0 | probably out-of-date) information about nodes that were previously on the node's list could be used. Thus each node might keep a record of all the other nodes known to be available within the network together with their connectivities, but this record remains distinct from the concept of the list. In addition the utility of a target node can be defined according to a combined function (typically as a weighted sum of all the factors which are being taken into account) of the target node's number of connections and resource level (although of course other factors may also or alternatively be taken into account). This use of a multi-criteria connection rule is similar to a process adopted in related work on self-organising P2P networks [Ledlie J., Taylor J., Serban L., Seltzer M., "Self-Organization in Peer-to-Peer Systems", in Proceedings of EW SIGOPS 2002 conference. St. Emilion, Bordeaux, France, 2002.]. In the case of a random node failure the system adapts and the network grows new connections in the vicinity of the damaged area. This is due to the nodes that lost links now having free channels to establish new connections, and hence actively attempt to grow new links to available nodes.

The addition of this rule is extremely beneficial in enabling the resulting network to adapt to the frequent arrival and removal of nodes. However, there are two potential drawbacks with the use of the Dynamic Growth rule that need to be addressed. These are, firstly an excessive numbers of links can reduce the efficiency of the network and incur resource costs. Second, in the case of a targeted attack the network can be heavily damaged if the growth rule uses any form of preferential attachment [Albert R., Jeong K., and Barabási A., "Attack and error tolerance of complex networks", Nature 406 378, 2000.]. This is often the case if the network is trying to optimize some parameter, e.g. efficiency, or number of hops to a resource [Saffre F., Jovanovic H., Hoile C., and Nicolas S., "Scale-free topology for pervasive networks", BT Technology Journal, Vol 22 No 3, July 2004.]. In the report of simulated experiments that appears below we present a potential solution to this potential drawback based on a network topology constraint model.

A development of the approach set out above affects how nodes make connections to other nodes. In the foregoing it is assumed that a node can connect to any other node in the system. Below we describe some variants which affect the identities of the nodes to which connection should be made (based on certain characteristics or properties) and which can work to constrain the number of connections made by any node.

Growth Constraints

In order to provide a constraint on excessive numbers of node connections being made we can introduce an artificial bandwidth constraint mechanism. In this case each node has a variable limit set on the rate at which it can grow new connections. This limit would be set to reflect the nodes real network capacity in a physical implementation.

In order to address the second problem associated with the brittle nature of a preferentially attached network and the destructive impact of a targeted attack, an additional constraint can be added to the Dynamic Growth rule. This is based on a constraint using a neighbourhood topology metric, (e.g. space, or social tags [Hales, D. "Self-Organising, Open and Cooperative P2P Societies—From Tags to Networks". Presented at the 2nd Workshop on Engineering Self-Organising Applications (ESOA 2004) located in AAMAS New York, 2004.]). Here we use a 2D-simulation model with a simple Cartesian distance constraint between nodes. Whichever constraint metric is used the effect is to limit the percentage of available nodes that any given node can connect to at each time step. The impact on the resulting P2P network topology, and its dynamic behaviour under attack, is very interesting and is discussed in the section below which deals with simulation experiments and results.

Simulation Experiments and Results

This section describes the experimental solution used to test these concepts. The work used a P2P simulation built on the Repast multi-agent simulation platform [http://repast.sourceforge.net/]. This provides a pure Java simulation environment with such features as run-time model manipulation via GUI widgets, logging, and a range of scheduling methods. It also facilitates replication of work by offering a common simulation platform. Here the model constructed used a 2-D bounded space with one agent represented by a single node in the space. At each time step each agent is scheduled to run the frequency, feedback, symmetry, decay, new node, connection removal and dynamic growth rules (the "system rules"). After a minimum of 5000 iterations the resulting network is sampled to determine the topology or required statistical parameter; such as average path length or edge degree distribution.

Search and Weighted Edge Graphs

The first set of experiments was aimed at testing the hypothesis that using weighted edges with simple Hebbian learning can increase the efficiency of search in unstructured P2P networks. The message efficiency $e_f$ was defined as the percentage of positive responses received by a node as a function of the number of transmitted search requests.

FIG. 5 shows the effect on message efficiency of using weighted edges compared to a network grown with fixed edge weights (all w=1.0.) For the duration of the experiment $e_f$ is virtually identical for both cases. The value of $e_f$ increases as a sigmoidal function and reaches a maximum at ~60%.

However, if the edge weights are dynamically updated using the system rules, the average connectivity $n_c$ during the growth phase of the network is substantially lower than that for the fixed weight case. Assuming the resource cost is a function of the number of edges per node, the use of the system growth and decay rules therefore results in a reduced resource cost to the system, during the growth period.

Network Resilience

An important aim of the new algorithm is to increase to the resilience and adaptability of an inter-agent P2P network. Using a constrained attachment version of the algorithm, as defined under Growth Constraints above, the resulting network proves far more resistant to a simulated targeted attack. The specific attack scenario is a targeted attack from t=1000, against a network grown using the Dynamic Growth rule. (For a targeted attack we assume the attacker has global knowledge of the network and probabilistically selects the node with the highest edge degree at random intervals and deletes that node, i.e. a worst case scenario) This is illustrated in FIG. 6a, which shows the effect of constraining the range d each node can communicate by from d=0.2-1.0 of the simulation space. In the case where each node is allowed to connect to any node in the space (d=1.0) the system rapidly achieves maximum average connectivity. However, a targeted attack begins at t=1000 time steps, and by t=5000 the resulting connectivity collapses to oscillate chaotically between ~25-70%. In this mode the giant component of the network also becomes disconnected into a number of small subnets. As the permitted range falls below approximately d=0.3 the resulting network connectivity under the same attack sequence still falls but remains stable at ~55-60%. Below a range of 0.20 the average connectivity remains stable but tends to zero as the range parameter is reduced. Hence the optimum range parameter was found to be ~0.3 of the simulation spatial range.

Figure 6B:
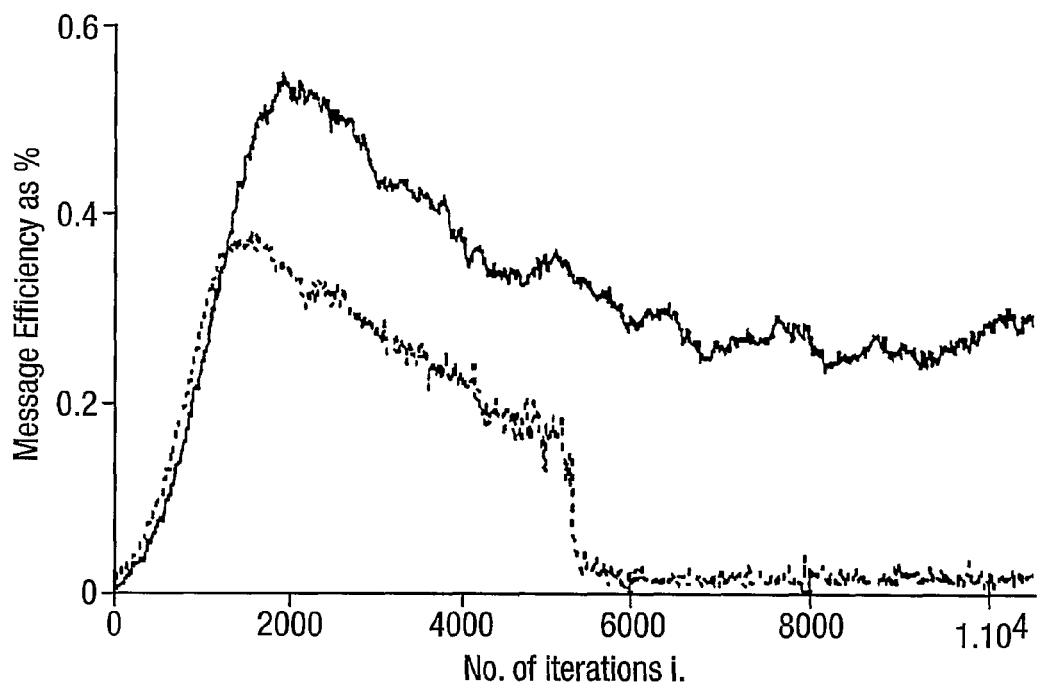

The most interesting effect of the attack process is shown in FIG. 6b, where the impact on search efficiency is more pronounced and immediate than the effect on node connectivity. Hence although the attack has reduced $n_d$ for all values of d, the resulting network exhibits far greater stability and reliable connectivity when the cellular constraint protocol is used.

FIG. 6b shows the impact of the attack on the average efficiency of message search in the network. In this case the effect on the unconstrained network is even more significant as the efficiency falls to almost zero after t=5000, while the constrained case retains an efficiency>30%.

In effect what this constrained dynamic growth rule produces is an emergent soft-celled overlay structure on the network. Hence when a node with a large number of edges is deleted the number of nodes it affects is constrained to a smaller percentage of the total node population.

Figure 7:
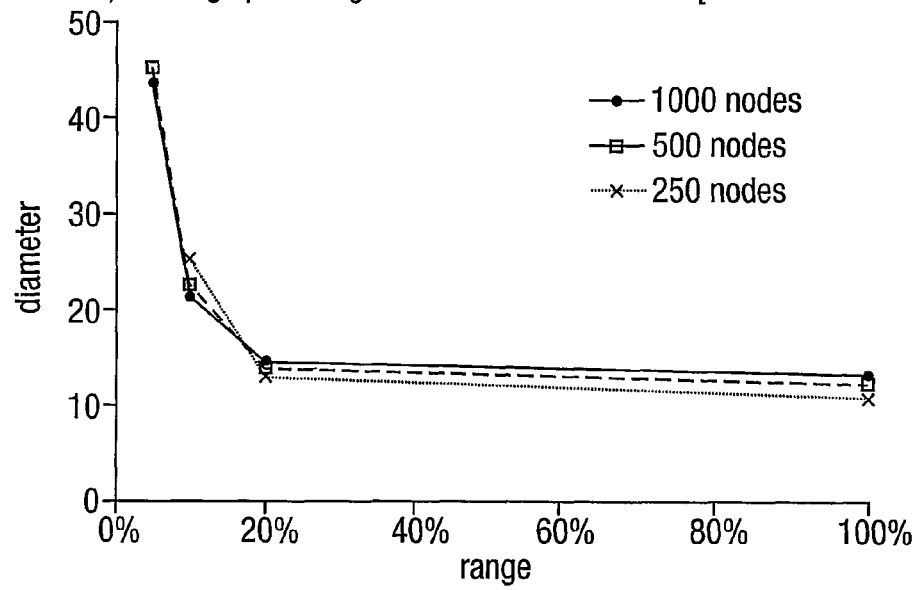
FIG. 7 shows evolution of network diameter as a function of communication range.

Work on P2P ad-hoc networks by has demonstrated that limiting the connection range of nodes in a dynamic peer-to-peer class network also has a minimal impact on the key properties of average path length and network diameter. This is illustrated in FIG. 7. The implication for this work is that using a restricted virtual connection neighbourhood (or tag) to increase the resilience of the network, can have minimal cost on the desired global network topology parameters and efficiency of search processes.

Graph Topology

Figure 8:
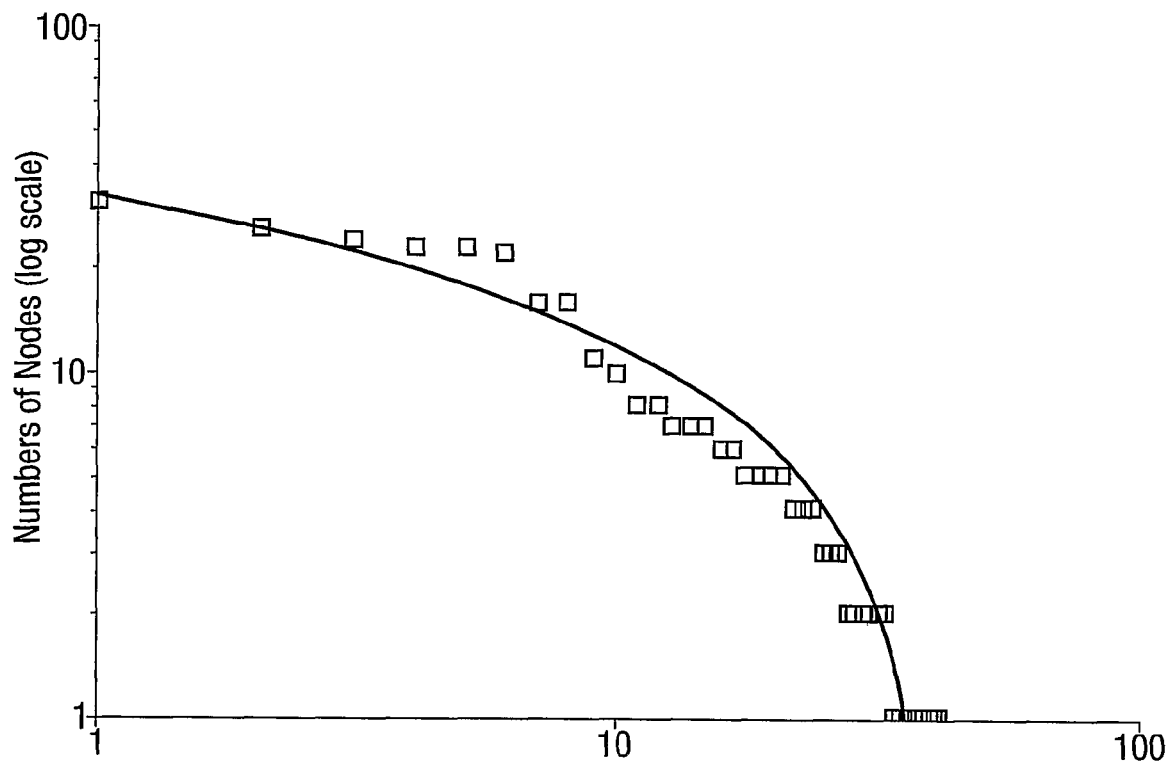
FIG. 8 shows node degree distribution as a function of the number of nodes for a system according to the invention.

We have also investigated the topology of the resulting network under a range of attack and random deletion scenarios. Since the algorithm is using a preferential attachment rule for local connections and a random long range connection process, we would expect the node degree distribution to be approximately scale free with a power law distribution. However, the degree distribution is shown in FIG. 8, appears to be closer to an exponential distribution. This reflects previous related results where a network is grown from a large number of existing nodes rather than growth from a single seed node. It is also in good agreement with work from studies of physical and real social networks that exhibit complex topologies, i.e. neither simply scale-free, nor exponential. In particular such studies consider both the age and cost of vertices during growth. Since the system algorithm is using a weighted edge structure, then the results indicated in FIG. 5 conform to that expected for this class of networks.

It is useful to compare this result with the measured topology of the Gnutella network from 2001 [Ripeanu M., Foster I., and Iamnitchi A., "Mapping the Gnutella network: Properties of large-scale peer-to-peer systems and implications for system design", IEEE Internet Computing Journal, vol.6, no.1, 2002.]. Of interest is that the reported distribution for the Gnutella network, after it had undergone substantial evolutionary development and refinement of the protocol algorithms, resulted in a similar distribution to that in FIG. 8. In that study the author proposes that:

" . . . the more uniform connectivity distribution preserves the network capability to deal with random node failures while reducing the network dependence on highly connected, easy to single out nodes.". This indicates that the system algorithm may offer a similar degree of resilient behaviour in a deployed environment.

Network Dynamics and Future Work

Based on the observed results a comparative dynamics model was explored that demonstrates closely related dynamical behaviour, i.e. the generalised Ising model. (For an introduction to the Ising model see [Cipra, B. A. "An Introduction to the Ising Model." Amer. Math. Monthly 94, 937-959, 1987]). The Ising model imitates behaviour in which individual elements modify their behaviour so as to conform to the behaviour of other individuals in their vicinity. Originally used to explain empirically observed results for ferromagnetic materials, it has since been widely applied to agent systems and economic models.

The model specifies that given a set of N individuals arranged in a lattice, each individual can be in one of two different states, for example, +1 and −1. Using the simplest form of the model with spin vector interaction restricted to nearest neighbours, an expression for the energy of any particular state is given by:

$$E = -J \sum_{\langle i,j \rangle} S_i S_j - B \sum_k S_k \tag{12}$$

Where: S(j) is the value of the spin at the j-th site in the lattice, with S=+1 if the spin is pointing Up and S=−1 if the spin is pointing Down. The <ij> subscript on the summation symbol indicates that the spin-spin interaction term, S(i)*S(j) is added up over all possible nearest neighbour pairs.

The constant J has dimensions of energy and it measures the strength of the spin-spin interaction. If J is positive the energy is lowered when adjacent spins are aligned. The constant B (again, an energy), indicates an additional interaction of the individual spins with some external magnetic field.

Comparing the behaviour of the agent population, once a sufficiently large network has formed, with the dynamics of the Ising model, we can equate the range parameter d with the spin interaction constant J, i.e. it determines the strength or probability of interaction between neighbouring agents. This is a potentially useful feature of this comparative model, as it offers a precise definition of inter-agent network connectivity dynamics, as defined by the Ising equation for interaction (Eq. 10).

The decay parameter (from the Decay rule) in the agent model can be equated with the constant B in the Ising model, i.e. an external interaction field that affects the agent's energy state. The agent model however is complicated by the large number of states per agent, and the ability of each agent to vary the strength of its interaction with its neighbours. However, the general dynamics of the Ising model remains a useful tool for analyzing the dynamics exhibited by this agent interaction model, in a qualitative and quantitative manner. Further work is planned to study this comparative model.

Messaging in Multi-Agent Systems

A key failing of current multi-agent systems has been the lack of a proactive behaviour within the agents in order to build social connections, combined with an over-complex set of messaging protocols [Wooldridge M., and Jennings N. R., "Pitfalls of Agent-Oriented Development", Proceedings of the 2nd International Conference on Autonomous Agents, pub.ACM Press, New York, editor Katia P. Sycara and Michael Wooldridge, pp. 385-391, 1998.]. As a consequence MAS tend to be brittle and sensitive to the loss of any core agent service; in particular that provided by directory services.

"During this implementation stage, valuable time (and hence money) is often spent implementing libraries and software tools that, in the end, do little more than exchange KQML-like messages across a network . . . . One technique for managing multiagent dynamics is to restrict the way that agents interact. Thus, very simple cooperation protocols are preferable to richer ones, with "one-shot" protocols (such as requesting and replying) being both adequate and desirable for many applications.".

A more general discussion of the technical challenges facing MAS is in the paper by Luck [Luck M., McBurney P., and Preist C., "Agent Technology: Enabling Next Generation Computing (A Roadmap for Agent Based Computing)", AgentLink, 2003.]. Using the SCAN protocol within a multi-agent framework would allow each agent to be proactive in constructing a social network of agents able to provide the set of services it requires.

CONCLUSION

We have proposed that a highly desirable motivation for any autonomous agent is the urge to create and sustain what might be termed social networks. Using this motivation to manage behaviours responsible for building and updating connections allows the formation of a self-organising and adaptive communication network. A prototype peer-to-peer agent application has been simulated using this concept and demonstrated a significant capacity to self-heal and adapt under a range of network failure scenarios.

In particular, the use of dynamic edge weights based on node utility, enables an efficient self-organising and adaptive overlay network to be built. The use of dynamic edge weights means that connections to nodes with irrelevant or poor resources are automatically removed.

Secondly, an emergent cellular topology results from the constrained Dynamic growth rule. This also preserves the short path length and network diameter achieved via preferential attachment, while providing a resilient response to targeted attacks.

Finally, the value of this approach lies in the potential to automate the connection mechanisms underlying distributed MAS. The ability to sustain what we have termed social networks is an important factor in the adoption rate of agent technology in the wider context, since ultimately an agent is only as useful as the range of services it can access. We propose that it should therefore be an agent's first priority to build networks of associates, and this task should not be simply allocated to a messaging sub-system.

A number of related technologies for automatic service discovery and zero-configuration are being developed. For example in the web-services protocols arena, Ws-discovery is a useful step towards the level of autonomous and pro-active service and application connectivity required.

In summary, the system described has the following major benefits:

It provides a novel approach to self-organise distributed peers in P2P systems without global system knowledge or central control.

It is a weighted network, in which a connection strength or weight indicates the possible contribution a node may contribute to another during resource sharing. The contribution is dependent on not only the proximity (?) of two nodes but also the possible quality of service a node may provide to another.

It learns useful correlations between nodes via Hebbian rules through experience in real time. In consequence the learning is unsupervised, which does not require specific training data in advance.

It is adaptive to changing network environments; including the addition of new nodes, removal of stale nodes and changes of state in existing nodes.

As connection strengths suggest nodes' current conditions such as their work load and communication speed, this information can help it to select suitable nodes for resource sharing with efficient load balancing and quality of services.

In conclusion, the system can support more efficient and effective resource sharing between distributed peers due to its adaptive and flexible weighted network structure.

The invention claimed is:

1. A station for use as a node in a peer-to-peer communications system, comprising:
   communication means for communicating with other such stations;
   storage for storing a list of stations to which requests for resources may be sent, said list including for each member a performance parameter;
   control means operable
   (a) in response to a request for resources to select at least one station from the list and send a resource request message to it;
   (b) in response to a reply to update the respective performance parameter; and
   (c) in response to a request for resources that it can itself supply to send a reply to an originator of the request;
   including means operable upon receipt of a reply to a request for resources to assess the quality of the reply and to adjust the parameter by an amount dependent on said quality, and further including means operable to cause a progressive decay of the performance parameters with time.

2. The station as claimed in claim 1, wherein the rate at which the performance parameters are decayed is dependent upon the number of stations stored in the list.

3. The station as claimed in claim 2, wherein the decay rate is inversely proportional to the number of stations stored in the list.

4. The station as claimed in claim 2, wherein, above a threshold number of stations, the decay rate is inversely proportional to the number of stations stored in the list.

5. The station according to claim 1, wherein the selection of the station from the list is performed by a random, pseudorandom or heuristic process such that the probability of selection of any station is a function of the stored parameter.

6. The station according to claim 1, in which the control means are operable (i) upon updating its performance parameter in respect of another station to send to that station an update message containing an indication of the change to the performance parameter so that said another station updates its own performance parameter in respect of the station; (ii) upon receipt of such an update message from another station to update its performance parameter in respect of the station sending the update message.

7. The station according to claim 6 in which the change indication contained in the update message, or the update step, applies a factor ($\eta$) such that the parameter change made by a replying station is less than that made by the station sending the update message.

8. The station according to claim 6, in which the control means are operable upon receipt of an update message in respect of a station not listed in the list to add that station to the list.

9. The station according to claim 1, in which the control means are operable upon receipt from a station of a reply which indicates that the request was routed to the replying station via at least one intermediate station to update the performance parameter in respect of one or more of the intermediate stations.

10. The station according to claim 9 in which the control means are operable
   (i) to send to one or more said intermediate stations an update message, the update message containing an indication of the change to the performance parameter and specifying another intermediate station, so that the intermediate station may update its own performance parameter in respect of the specified intermediate station; and
   (ii) upon receipt of such an update message from another station to update its performance parameter in respect of the station specified in the message.

11. The station according to claim 9 in which the control means are operable
   (i) to send to the replying station an update message containing an indication of the change to the performance parameter and specifying an intermediate station so that the replying station updates its own performance parameter in respect of the specified intermediate station; and
   (ii) upon receipt of such an update message from another station to update its performance parameter in respect of the station specified in the message.

12. The station according to claim 1, including means operable in the event that the performance parameter in respect of a station reaches a level corresponding to a predetermined level of poor performance to remove that station from the list.

13. A network comprising a plurality of stations according to claim 1.

14. The station as claimed in claim 1,
   wherein the rate at which the performance parameters are decayed is dependent upon the number of stations stored in the list;
   wherein the decay rate is inversely proportional to the number of stations stored in the list.

15. The station as claimed in claim 14,
   wherein the rate at which the performance parameters are decayed is dependent upon the number of stations stored in the list; and
   wherein, above a threshold number of stations, the decay rate is inversely proportional to the number of stations stored in the list.

16. A station for use as a node in a peer-to-peer communications system, comprising:
   communication means for communicating with other such stations;
   storage for storing a list of stations to which requests for resources may be sent, said list including for each member a performance parameter;
   control means operable
      (a) in response to a request for resources to select at least one station from the list and send a resource request message to it;
      (b) in response to a reply to update the respective performance parameter;
      (c) in response to receipt of a request for resources that it can itself supply to send a reply to an originator of the request; and
   including means operable to cause a progressive decay of the performance parameters with time, wherein the selection of the station from the list is performed by a random, pseudo-random or heuristic process such that the probability of selection of any station is a function of the stored parameter.

17. The station as claimed in claim 16, wherein the rate at which the performance parameters are decayed is dependent upon the number of stations stored in the list.

18. The station as claimed in claim 17, wherein the decay rate is inversely proportional to the number of stations stored in the list.

19. The station as claimed in claim 17, wherein, above a threshold number of stations, the decay rate is inversely proportional to the number of stations stored in the list.

20. The station according to claim 16, including means operable upon receipt of a reply to a request for resources to assess the quality of the reply and to adjust the parameter by an amount dependent on said quality.

21. The station according to claim 16, in which the control means are operable
   (i) upon updating its performance parameter in respect of another station to send to that station an update message containing an indication of the change to the performance parameter so that said another station updates its own performance parameter in respect of the station;
   (ii) upon receipt of such an update message from another station to update its performance parameter in respect of the station sending the update message.

22. The station according to claim 21 in which the change indication contained in the update message, or the update step, applies a factor ($\eta$) such that the parameter change made by a replying station is less than that made by the requesting station sending the request message.

23. The station according to claim 21, in which the control means are operable upon receipt of an update message in respect of a station not listed in the list to add that station to the list.

24. The station according to claim 16, in which the control means are operable upon receipt from a station of a reply which indicates that the request was routed to the replying station via at least one intermediate station to update the performance parameter in respect of one or more of the intermediate stations.

25. The station according to claim 24, in which the control means are operable
   (i) to send to one or more said intermediate stations an update message, the update message containing an indication of the change to the performance parameter and specifying another intermediate station, so that the intermediate station updates its own performance parameter in respect of the specified intermediate station; and
   (ii) upon receipt of such an update message from another station to update its performance parameter in respect of the station specified in the message.

26. The station according to claim 24 in which the control means are operable
   (i) to send to the replying station an update message containing an indication of the change to the performance parameter and specifying an intermediate station so that the replying station may update its own performance parameter in respect of the specified intermediate station; and
   (ii)) upon receipt of such an update message from another station to update its performance parameter in respect of the station specified in the message.

27. The station according to claim 16, including means operable in the event that the performance parameter in respect of a station reaches a level corresponding to a predetermined level of poor performance to remove that station from the list.

28. The station as claimed in claim 16,
wherein the rate at which the performance parameters are decayed is dependent upon the number of stations stored in the list; and
wherein the decay rate is inversely proportional to the number of stations stored in the list.

29. The station as claimed in claim 16,
wherein the rate at which the performance parameters are decayed is dependent upon the number of stations stored in the list; and
wherein, above a threshold number of stations, the decay rate is inversely proportional to the number of stations stored in the list.

30. The method of operating a station as a node in a peer-to-peer communications system, the method comprising:
communicating with other such stations;
storing a list of stations in order to send at least one request for resources to at least one of the stations, said list including for each member a performance parameter;
in response to a request for resources, selecting at least one station from the list and send a resource request message to it;
in response to a reply, updating the respective performance parameter; and
in response to a request for resources that it can itself supply, sending a reply to an originator of the request;
upon receipt of a reply to a request for resources, assessing the quality of the reply and adjusting the parameter by an amount dependent on said quality; and
causing a progressive decay of the performance parameters with time.

31. The method as claimed in claim 30, wherein the rate at which the performance parameters are decayed is dependent upon the number of stations stored in the list.

32. The method as claimed in claim 31, wherein the decay rate is inversely proportional to the number of stations stored in the list.

33. The method as claimed in claim 31, wherein, above a threshold number of stations, the decay rate is inversely proportional to the number of stations stored in the list.

34. The method according to claim 30, wherein the selection of the station from the list is performed by a random, pseudo-random or heuristic process such that the probability of selection of any station is a function of the stored parameter.

35. The method according to claim 30, further comprising:
(i) upon updating its performance parameter in respect of another station, sending to that station an update message containing an indication of the change to the performance parameter so that said another station possesses the ability to update its own performance parameter in respect of the station; (ii) upon receipt of such an update message from another station, updating its performance parameter in respect of the station sending the update message.

36. The method according to claim 35 in which the change indication contained in the update message, or said updating, applies a factor ($\eta$) such that the parameter change made by a replying station is less than that made by the station sending the update message.

37. A method of operating a station as a node in a peer-to-peer communications system, the method comprising:
communicating with other such stations;
storing a list of stations in order to send at least one request for resources to at least one of the stations, said list including for each member a performance parameter;
in response to a request for resources, selecting at least one station from the list and send a resource request message to it;
in response to a reply, updating the respective performance parameter;
in response to receipt of a request for resources that it can itself supply, sending a reply to an originator of the request; and
causing a progressive decay of the performance parameters with time, wherein the selection of the station from the list is performed by a random, pseudo-random or heuristic process such that the probability of selection of any station is a function of the stored parameter.

38. The method as claimed in claim 37, wherein the rate at which the performance parameters are decayed is dependent upon the number of stations stored in the list.

39. The method as claimed in claim 38, wherein the decay rate is inversely proportional to the number of stations stored in the list.

40. The method as claimed in claim 38, wherein, above a threshold number of stations, the decay rate is inversely proportional to the number of stations stored in the list.

41. The method according to claim 37, wherein upon receipt of a reply to a request for resources, assessing the quality of the reply and adjusting the parameter by an amount dependent on said quality.

42. The method according to claim 37, further comprising:
(i) upon updating its performance parameter in respect of another station, sending to that station an update message containing an indication of the change to the performance parameter so that said another station possesses the capability to update its own performance parameter in respect of the station;
(ii) upon receipt of such an update message from another station, updating its performance parameter in respect of the station sending the update message.

43. The method according to claim 42 in which the change indication contained in the update message, or said updating, applies a factor ($\eta$) such that the parameter change made by a replying station is less than that made by the requesting station sending the request message.

* * * * *